United States Patent
Larsson et al.

(10) Patent No.: US 8,606,416 B2
(45) Date of Patent: Dec. 10, 2013

(54) ENERGY GENERATING SYSTEM AND CONTROL THEREOF

(75) Inventors: Mats Larsson, Baden-Daettwil (CH);
Adrian Timbus, Baden-Daettwil (CH);
Carsten Franke, Birmenstorf (CH);
Jorge Naccarino, Sugar Land, TX (US)

(73) Assignee: ABB Research Ltd., Zürich (CH)

( * ) Notice: Subject to any disclaimer, the term of this patent is extended or adjusted under 35 U.S.C. 154(b) by 765 days.

(21) Appl. No.: 12/708,253

(22) Filed: Feb. 18, 2010

(65) Prior Publication Data

US 2011/0202191 A1    Aug. 18, 2011

(51) Int. Cl.
*G05D 11/00*    (2006.01)

(52) U.S. Cl.
USPC ............... 700/286; 700/22; 700/32; 700/287

(58) Field of Classification Search
USPC ...................... 700/22, 32, 286–287, 291, 295
See application file for complete search history.

(56) References Cited

U.S. PATENT DOCUMENTS

| 2010/0198420 A1* | 8/2010 | Rettger et al. ................ 700/291 |
| 2011/0220091 A1* | 9/2011 | Kroyzer ........................ 126/572 |

* cited by examiner

*Primary Examiner* — Mohammad Ali
*Assistant Examiner* — Nathan Laughlin
(74) *Attorney, Agent, or Firm* — Buchanan Ingersoll & Rooney PC

(57) ABSTRACT

A system and method of controlling an electricity generating system that includes at least one intermittent energy source generating plant are disclosed. An exemplary method includes calculating actual operating parameters of the at least one intermittent energy source generating plant; calculating forecast operating parameters of the at least one intermittent energy source generating plant; generating intermittent energy source contingency definitions from such actual operating parameters and forecast operating parameters; analysing the intermittent energy source contingency definitions to provide contingency analyses; and controlling the electricity generating system in dependence upon such contingency analyses.

5 Claims, 3 Drawing Sheets

ENERGY GENERATING SYSTEM AND CONTROL THEREOF

FIELD

An energy generating system and an associated method of control are disclosed, such as an energy system and generating system which includes a wind power generating plant.

BACKGROUND INFORMATION

Known energy generating systems have relied on power grids predominantly supplied with energy from fossil fuels and nuclear power. Such energy sources fit comfortably with the need for responsive energy supply and thus the energy generation systems have been reasonably straightforward to both analyze and control. In such energy generating systems, it is known for contingency analysis to be used to facilitate system management. Contingency analysis has been used to analyze the impact of hypothetical disturbance conditions in the power grid of the energy generating system. Such contingency analysis involves analyzing a large set of credible contingencies and, from this analysis, identifying in real time a number of contingencies that could create instability or overload in the power grid.

An example of a contingency analysis module 10 within a process system 1 which forms part of a traditional energy generating system is shown in FIG. 1. A supervisory control and data acquisition system 12 collects measurements and status, indications 14 from a power grid and transmits them to a state and topology, estimator 16. The estimator 16 analyzes the collected measurements and indications and computes a mathematical model which represents the actual state of the power grid in real time. The model and state is transmitted via 18 from the estimator 16 to a contingency analysis engine 20 which is a component of the contingency analysis module 10. A list 22 of a large number (N) of credible contingencies is also transmitted via 24 to the Engine 20. Using the data received from the estimator 16 and list 22, the engine 20 computes a severity index based on the current network state that has been modified through the application of each of the N credible contingencies, one by one. These computations are transmitted via 26 to the sorting and classification module 28 where they are ranked according to the severity index. From the ranked computations those having a most severe ranking can be collated to form a small subset (n) of the contingencies, and this subset can be transmitted via 30 out of the contingency analysis module forming the worst contingencies output 32.

The worst contingencies subset n is, for example, on the order of 10s, and a full list of critical contingencies N can have thousands, or tens of thousands of members. So that the process of contingency analysis can be completed in a reasonable time, only single contingencies and a few combinations of two contingencies can be studied.

In known energy generation systems, the types of contingencies that are included in N are outages of single components such as power lines, generators or other pieces of equipment. Faults such as bus-bar faults can also be modelled; this involves the de-energization of the faulted bus-bar accompanied by the disconnection of all lines and generation units connected to the respective bus-bar. Although modelling of a contingency of this type relates to multiple components, it is still the modelling of a local effect originating in the substation where the faulty bus-bar is located.

The integration of natural, intermittent, energy sources such as wind power, solar, tidal or wave power, into the power grids of energy generating systems presents a new challenge in the management and control of energy generating systems. For example, one challenge is the intermittency of their power production which is dependent on meteorological phenomena such as wind speed, solar irradiance, and so forth. This intermittency results in power generated from renewable energy sources being relatively unreliable compared to traditional energy sources, such as fossil fuels from which energy generation can be actively and accurately dispatched.

Examples of scenarios that can arise with wind generated power which are relevant to contingency analysis include severely strong winds occurring over a wide geographical area, a sudden weakening of wind over a large area, and a sudden wind increase over a wide geographical area.

When severely strong winds arise, the wind turbines affected can have a built in self protection mechanism which disconnects them from the power grid to prevent them from being damaged. If, for example, severely strong winds occur over a wide geographical area for a sustained period of tens of minutes, this mass disconnection of wind turbines would result in the energy output from the energy generation system falling substantially and being unable to meet energy demand.

A change in the weather front over a geographical area can be accompanied by a suddenly weakened wind; this would result in a sudden drop in energy generation, meaning the output from the energy generation system would perhaps not be sufficient to meet user demand.

A sudden wind increase over a wide area could also lead to a rapid increase in the wind power being generated; this in turn could overload transmission lines in the vicinity of the wind generation unit. Within a few minutes, this could result in the disconnection of the line and, if there is no other transfer path that can transport the energy produced by the wind generation, this could result in an indirect loss of the wind generation. If there are other paths, the energy will be transported on these other paths which similarly run the risk of overload and disconnection. In such scenarios, it is not uncommon for cascading line disconnections propagating into a wide-spread blackout.

Such sudden drops in output from the energy generation system could reasonably result in power outages. Even if power outages were avoided, it could be the case that users would need to be disconnected on a rotating basis. Each of these situations results in inconvenience to users and potential loss of revenue to energy generation system operators.

Furthermore, wind generation is often provided by many small wind farms, or units, situated in different locations across the power grid. These wind farms will likely be subjected to the same weather factors, possibly with some time delays. Thus, they are affected by the disturbances in a coherent way. For example, if a storm front first passes over a wind farm which disconnects, it is very likely that the same storm will move to other areas causing a similar effect there. Such wind generation, may lead to a sudden increase of the production in the case of moderate wind bursts, sudden decrease of production in the case of sudden wind decrease, or disconnection and total loss of production due to disconnection of wind farms in the case of very large wind speeds.

As can be seen, the outages or disturbances of wind generation components of an energy generation system are no longer uncorrelated, which is an assumption that forms the basis of the classical approach to contingency analysis. Because of this, a known way of treating a generator as an individual unit in contingency analysis, can lead to overly optimistic ranking of wind generation components.

Thus, to address effective control of an energy generation system a contingency analysis should reflect coherent inconsistencies of power input from power generation sources such as a wind turbine.

Current forecasting tools can provide a relatively accurate assessment and forecast of the production of power from a wind generation component. One such forecasting tool uses a two stage procedure where a numerical weather prediction service is first used to obtain wind forecasts. Models of wind turbines and wind farms are then used to create corresponding forecasts with associated confidence intervals and/or estimates of the statistical distribution of the production as a function of forecasted time. Forecast inaccuracies in percent of rated power are, for example, 3-5% for large groups of wind turbines, and up to 10% for individual wind power turbines. An exemplary graphical representation of such a wind power production forecast is shown in FIG. 2. The forecast 34 is shown between limits set by the percentage inaccuracies which give an upper confidence limit 36 and a lower confidence limit 38. The confidence bounds are retrieved from the wind forecast provider which provides, for example, predicted mean value and upper/lower confidence limits. The wind forecast provider produces this by, for example, combing information from a numerical weather prediction with information about the physical characteristics of the wind power plants.

However, as existing contingency analysis modules process uncorrelated outages of single components in a power grid, disturbances such as those detailed above are not represented. Therefore energy generating systems which have input from an intermittent energy source are not controlled in an optimum manner.

SUMMARY

A method is disclosed for controlling an electricity generating system that includes at least one intermittent energy source generating plant, the method comprising: calculating an operating parameter of the at least one intermittent energy source generating plant; generating an intermittent energy source contingency definition from the operating parameter; analyzing the intermittent energy source contingency definition to provide a contingency analysis; and controlling the electricity generating system in dependence upon the contingency analysis.

A method is also disclosed for controlling an electricity generating system that includes at least one intermittent energy source generating plant, the method comprising: calculating an actual operating parameter of the at least one intermittent energy source generating plant; calculating a forecast operating parameter of the at least one intermittent energy source generating plant; generating an intermittent energy source contingency definition from at least one of the actual operating parameter and the forecast operating parameter; analyzing the intermittent energy source contingency definition to provide a contingency analysis; and controlling the electricity generating, system in dependence upon the contingency analysis.

A system is disclosed for controlling an electricity generating system having at least one intermittent energy source generating plant, comprising: means for calculating an operating parameter of the at least one intermittent energy source generating plant; means for generating an intermittent energy source contingency definition from the operating parameter; means for analyzing the intermittent energy source contingency definition to provide a contingency analysis; and means for controlling an electricity generating system in dependence upon the contingency analysis.

BRIEF DESCRIPTION OF THE DRAWINGS

These and other aspects of the disclosure will become apparent from the following detailed description, when taken in combination with the accompanying drawings in which.

DETAILED DESCRIPTION

A system and method are disclosed for controlling an electricity generating system which can provide more secure operation of the electricity generating system in the presence of generation intermittency arising from the use of intermittent energy sources. The electricity generating system can include at least one intermittent energy source generating plant. The method includes calculating operating parameters of the at least one intermittent energy source generating plant; generating intermittent energy source contingency definitions from such operating parameters; analyzing the intermittent energy source contingency definitions to provide contingency analyses; and controlling the electricity generating system in dependence upon such contingency analyses.

An exemplary alternate method includes generating additional contingency definitions for parts of the generating system other then the at least one intermittent energy source generating plant, and the additional contingency definitions can be analyzed in combination with an intermittent energy source contingency definition to provide a contingency analysis.

The at least one intermittent energy source generating plant can include plural intermittent energy source generators, and respective intermittent energy source contingency definitions can be generated for predetermined groupings of the intermittent energy source generators. Two intermittent energy source contingency definitions can, for example, be generated for each grouping of intermittent energy source generators.

The calculating of an actual operating parameter of the at least one intermittent energy source generating plant can include: measuring a predetermined number of parameters of the at least one intermittent energy source generating plant; and calculating an actual operating parameter using the measured parameters and a predetermined model of the at least one intermittent energy source generating plant.

At least one intermittent energy source contingency definition may be generated according to a predefined confidence interval.

The intermittent energy source can, for example, be wind power.

The operating parameter of the wind power generating plant may include wind speed and wind direction.

The term "intermittent energy source" is taken to encompass any natural renewable energy source, including but not limited to wind, wave or solar power, which due to vagaries of nature, may not be consistent in the power they provide.

Figure 3:
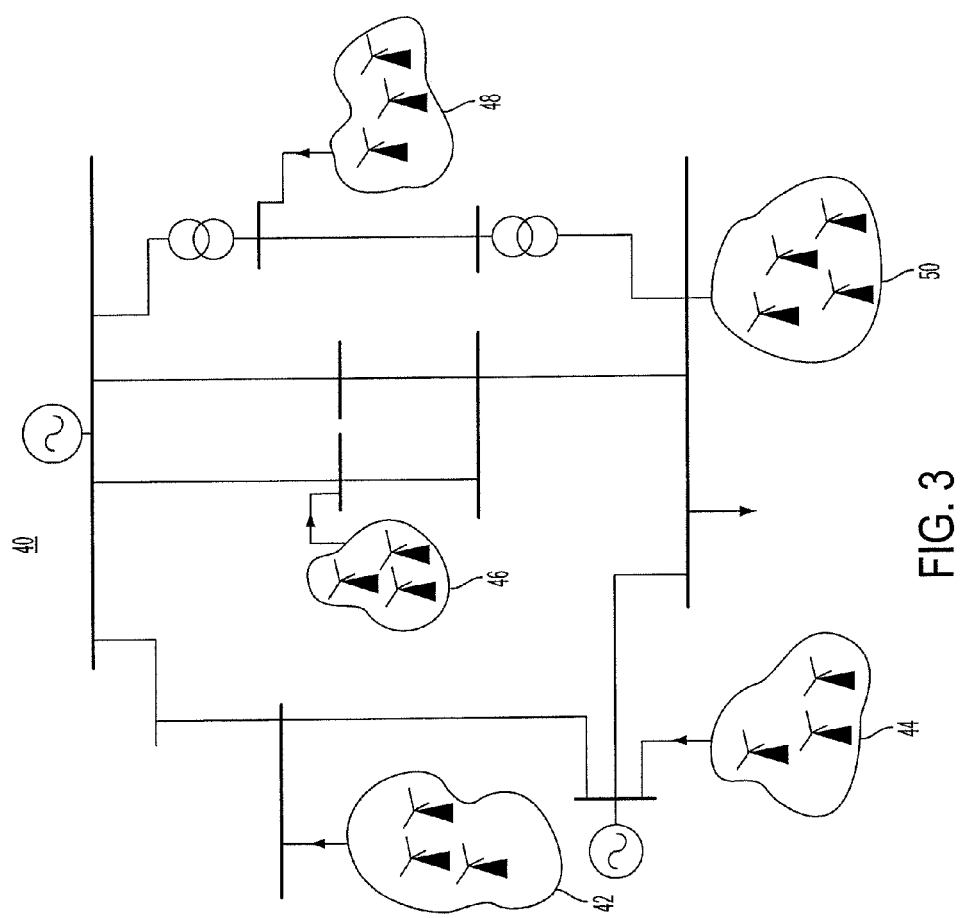
FIG. 3 shows an exemplary power grid, which includes wind power generating plants, of an energy generating system as disclosed herein.

Referring to FIG. 3 there is shown an exemplary power grid 40 of an energy generation system which includes intermittent energy source generating plants, such as wind farms 42, 44, 46 48 and 50. As can be seen, each of these exemplary wind farms can be spaced apart geographically and be of a different size from each of the other wind farms.

Figure 1:
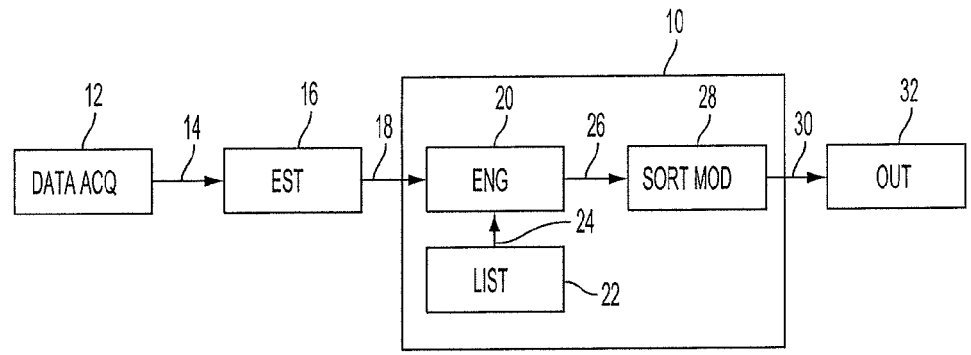
FIG. 1 shows a known contingency analysis module of an exemplary energy generating system.
Figure 4:
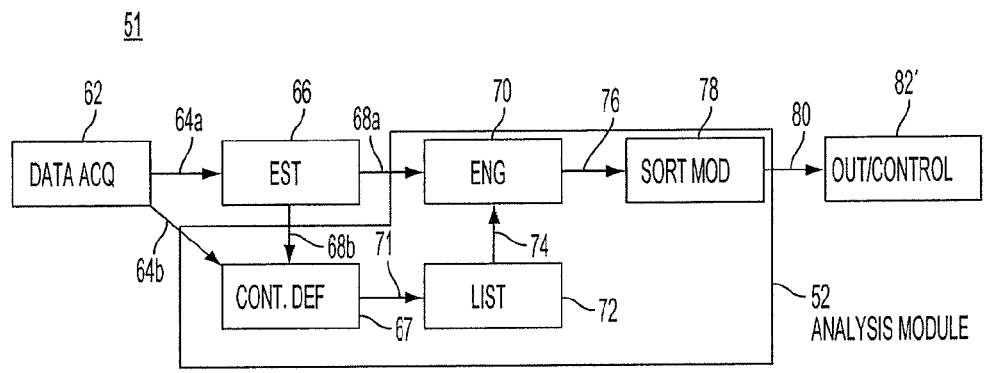
FIG. 4 shows an exemplary processing system of an energy generating system as disclosed herein.

With reference to FIG. 4 there is shown an exemplary intermittent energy source contingency analysis module 52 as part of an exemplary process system 51 for use with the power grid 40 of FIG. 3. The process system 51 can be formed as any combination of one or more software and/or hardware (e.g., firmware or computers) modules, and includes a Supervisory Control and Data Acquisition System 62 which collects measurements and status indications from power grid 40. The information collected can be measurement of the power production from each of the farms 42-50 and the wind speed at each of the farms 42-50. This information can then be transmitted via 64a to a calculating means represented as a State and Topology Estimator 66. A small subset of the information flowing to the State Estimator 66 can also be transmitted via 64b to a definition generating means represented as Wind Power Contingency Definition 67. The small subset of information can correspond to measurements related to wind power plants.

The Estimator 66 analyzes the collected measurements and indications, and can compute a mathematical model which represents the actual state of the power grid in real time. The model and state can be transmitted via 68a from the Estimator 66 to an analyzing means, represented as a Contingency Analysis Engine 70 which can, for example, be a component of the Contingency Analysis module 52.

The model and state can also be transmitted 68b to Wind Power Contingency Definition 67. This transmission via 68b is not mandatory and if, for example, enough measurements are available from the Supervisory Control and Data Acquisition System 62 then transmission 68b may not be desired. However, the transmission 68b can be beneficial in all cases, as the information provided by the State Estimator 66 may have a higher accuracy than just the measurements provided by the Supervisory Control and Data Acquisition System 62.

The Wind Power Contingency Definition 67 can also be provided with geographical information about the location of the wind farms 42-50 in the power grid 40. This information can be a configuration of data pre-programmed into the system at commissioning for the specific power grid with which it is used. The Wind Power Contingency Definition 67 can use the received information to generate wind power contingency scenarios which represent the effect of large wind variations. These wind power contingency scenarios M can be transmitted via 71 to be incorporated within list 72 of a large number (N) of credible contingencies. The list 72 can also be transmitted via 74 to the Engine 70. Using the data 68areceived from the Estimator 66 and list 72, the Engine 70 can compute a severity index based on the current network state for each of the N credible contingencies. These computations can be transmitted via 76 to the sorting and classification module 78, which can be part of the analyzing means, where they are ranked according to the severity index. From the ranked computations, those having the most severe ranking can be collated to form a small subset (n) of the contingencies. This subset can be transmitted via 80 out of the contingency analysis module forming the worst contingencies output 82', which can be configured as a means for controlling the electricity generating system of FIG. 3.

The measurement information transmitted via 68b into module 67 can result in new types of contingencies to be defined. These can include, for example:

1. Sudden loss or increase of energy production with a fixed preset percentage of the pre-contingency production at one farm, for example farm 42. An exemplary percentage loss or decrease would be, for example, 50% of the production. Alternatively, there could be a complete disconnection of the wind farm if winds were severe enough.
2. Sudden loss or increase of the energy production with a fixed preset percentage of the pre-contingency production at a group of farms, for example farms 42, 44 and 46. An exemplary percentage loss or decrease would be, for example, 50% of the production. Alternatively, there could be a complete disconnection of all of the wind farms in the group if winds were severe enough over the geographical area in which the farms are located.
3. Sudden loss or increase of the energy production of a fixed amount of wind power at a group of farms, for example farms 42, 44 and 46. The amount of variation in production can, for example, be allocated among all of the units, equally distributed or weighted by the rated capacity.

An example of one of these contingencies being applied can be described with reference to FIGS. 3 and 4. The production p at wind farms 42, 44, 46, 48 and 50 are $(p_{42}, p_{44}, p_{46}, p_{48}, p_{50}) = (1, 2, 1.2, 2, 5)$ prior to any contingency being applied.

A meteorological event occurring over a geographical area which includes wind farms 46, 48 and 50 can result in a sudden loss of wind as detailed in new contingency 2 above. In this case the loss of wind can, for example, be assumed as having a fixed reduction factor of 50%. Therefore, the production p at the wind farms post-contingency are $(p_{42}, p_{44}, p_{46}, p_{48}, p_{50}) = (1, 2, 0.6, 1, 2.5)$. This equates to an overall production decrease in the power grid.

If a meteorological event occurring over a geographical area which includes wind farms 46, 48 and 50 resulted in a sudden increase of wind as detailed in new contingency 2 above, and the loss of wind is assumed as having a fixed increase factor of 50%, the production p at the wind farms post-contingency are $(p_{42}, p_{44}, p_{46}, p_{48}, p_{50}) = (1, 2, 1.8, 3, 7.5)$. This equates to an overall production increase in the power grid.

Other disturbances which constitute a contingency can similarly be assessed on this basis to provide an appropriate indication of post contingency production.

In an exemplary embodiment, the wind production of some or all wind generation, in a power grid such as that in FIG. 3, is modelled in a statistical manner using the information given from any known wind forecasting tool which provides expected values of the production and the associated confidence interval. This permits multiple disturbances in the wind generation component of a power grid to be represented as a single equivalent contingency.

Figure 5:
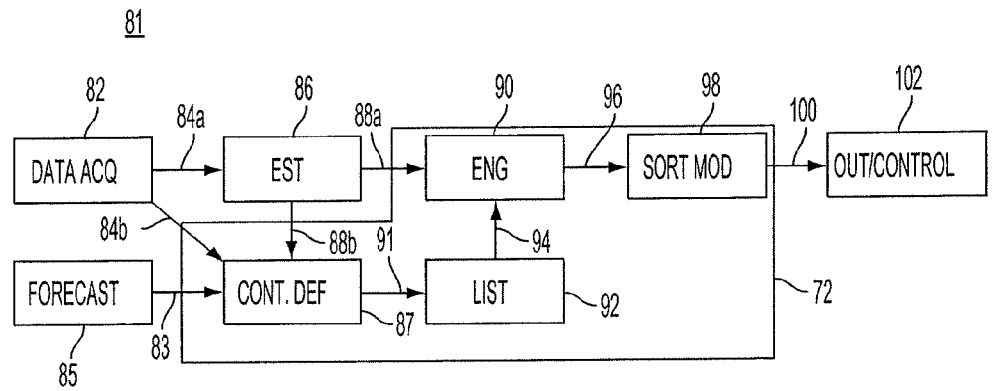
FIG. 5 shows another exemplary processing system of an energy generating system as disclosed herein.
Figure 2:
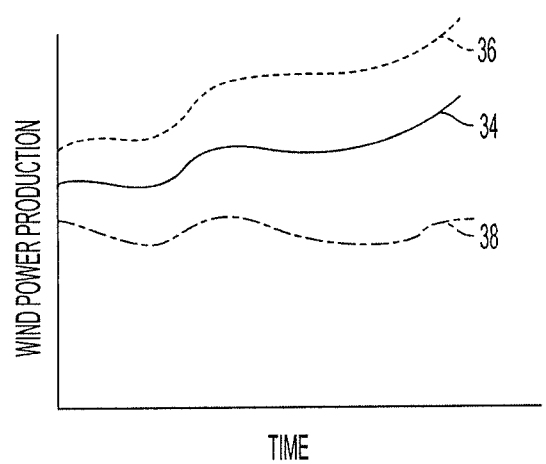
FIG. 2 shows a sample wind power production forecast generated using known forecasting techniques.

An exemplary illustration of an intermittent energy source contingency analysis module which is part of an exemplary process system 81 which would undertake this modelling is illustrated in FIG. 5, wherein means configured as software and/or hardware modules are again depicted. The process system 81 includes a Supervisory Control and Data Acquisition System 82 which collects measurements and status indications from power grid 40. In this exemplary case, the information collected is measurement of the power production from each of the farms 42-50 and the wind speed at each of the farms 42-50. This information is then transmitted via 84 to the State and Topology Estimator 86. A small subset of the information flowing to the State Estimator 86 is also transmitted 84b to Wind Power Contingency Definition 87; the small subset of information corresponds to measurements related to wind power plants.

The Estimator 86 analyzes the collected measurements and indications, and computes a mathematical model which represents the actual state of the power grid in real time. The model and state is transmitted via 88a from the Estimator 86 to a Contingency Analysis Engine 90 which is a component of the Contingency Analysis module 72. The model and state is also transmitted via 88b to Wind Power Contingency Definition 87. As before, this transmission 88b is not mandatory. If, for example, enough measurements are available from the Supervisory Control and Data Acquisition System 82 then transmission 88b may not be desired. However, the transmission 88b can be beneficial in all cases as the information provided by the State Estimator 86 may have a higher accuracy than just the measurements provided by the Supervisory Control and Data Acquisition System 82.

The Wind Power Contingency Definition 87 is also provided a transmission 83 from the Wind Power Generation Forecast module 85. The Wind Power Generation Forecast module 85 can provide expected values of production and the associated confidence interval. The Wind Power Contingency Definition 87 can be further provided with geographical information about the location of the wind farms 42-50 in the power grid 40. This geographical information comes from configuration data pre-programmed at the commissioning for the specific power grid with which it is used. The Wind Power Contingency Definition 87 can use the received information to generate wind power contingency scenarios which represent the effect of large wind variations.

These wind power contingency scenarios are transmitted via 91 to be incorporated within list 92 of a large number (N) of credible contingencies. The list 92 is also transmitted via 94 to the Engine 90. Using the data received from the Estimator 86 and list 92, the Engine 90 computes a severity index based on the current network state for each of the N credible contingencies. These computations are transmitted via 96 to the sorting and classification module 98 where they are ranked according to the severity index. From the ranked computations, those having the most severe ranking are collated to form a small subset (n) of the contingencies. This subset is transmitted 100 out of the contingency analysis module forming the worst contingencies output 102.

With further reference to Wind Power Generation Forecast module 85, the expected production for any given generator unit, in this case each wind farm 42-50, is considered a single generator unit, i is denoted as $E(p_i)$. For this expected production value $E(p_i)$, the associated confidence interval is denoted $CI(p_i)=[\alpha_{i,y}, \beta_{i,y}]$ where $\alpha_{i,y}, \beta_{i,y}$ refer to the lower y % and upper y % confidence limits respectively. The confidence limits are retrieved from the wind forecast provider, who can provide predicted mean value and upper/lower confidence limits. The wind forecast provider can produce this by combing the information from a numerical weather prediction with information about the physical characteristics of the wind farm, in this case wind farms 42-50. In this example, a normal distribution is assumed by the Forecasting Module 85 when computing the confidence interval. The underlying standard deviation of the forecast error can, for example, be estimated using:

$$\sigma_{p_i} = \frac{\beta_{i,y} - \alpha_{i,y}}{\sqrt{2}\,\text{erf}^{-1}(y/100)}$$

where $\text{erf}^{-1}$ is an inverse error function.

For the group of wind generation units described through the set i∈S, the sum production of this group of units is represented by:

$$p_S = \sum_{i \in S} p_i$$

and using the central limit theorem, the sum of the expected production value is represented as:

$$E(p_S) = \sum_{i \in S} E(p_i)$$

with associated standard deviation:

$$\sigma_{p_S} = \sqrt{\sum_{i \in S} \sigma_{p_i}^2}$$

Observation has shown that, for example, individual errors become less correlated the shorter the forecast horizon is and the further the geographical distance between the wind farms. For a contingency forecast, horizons of, for example, tens of minutes are of interest and within these, errors show very little correlation. Therefore, assuming that the individual errors in the forecasts of power generations $p_i$ in the set i∈S to be uncorrelated, then as the number of members of the set S increases, the statistical distribution of the sum $p_s$ will approach a normal distribution. As the statistical distribution of the sum $p_s$ approaches a normal distribution, a new, calculated, interval for confidence level y % can be computed using:

$$CI(p_s) = E(p_s) \pm \sigma_{p_s}\sqrt{2}\,\text{erf}^{-1}(y/100)$$

This calculated confidence interval for the area sum forecast can be used in the contingency definition to generate dynamic confidence limits instead of the fixed confidence limits for the wind generation contingencies above.

Once confidence intervals have been determined for sum production of a particular group of generators, a few exemplary contingencies can be generated as follows:

1. Sudden loss or increase of the energy production with an amount of power as forecasted by the forecast provider and having a certain confidence interval of the pre-contingency production at one farm, for example farm 42.
2. Sudden loss or increase of the energy production with an amount of power as forecasted by the forecast provider and having a certain confidence interval of the pre-contingency production at a group of farms, for example farms 42, 44 and 46.
3. Sudden loss or increase of the energy production of an amount of power as forecasted by the forecast provider and having a certain confidence interval at a group of farms, for example farms 42, 44 and 46. The amount of variation in production can be allocated among all of the units, equally distributed or weighted by the rated capacity.

For contingency generations, one can, for example, use 80% or 90% confidence intervals to generate the amount of power lost or gained through wind variations. These limits of the confidence intervals are chosen based on the level of security that is desired for the power system operation. For example, a 95% confidence interval implies that the operator is 95% certain that the power generation will be within the given confidence limits. This method can have an advantage that only two contingencies are generated for each group of wind generation units, which can lead to efficient processing and quick response of a contingency analysis.

This process can be considered with reference to FIGS. 3 and 5, and to a meteorological event occurring over a geographical area which includes wind farms 46, 48 and 50 resulting in a sudden loss of wind as detailed in new contingency 2 above. In this case, the loss of wind can, for example, be assumed as having a fixed reduction factor of 50%. Therefore the expected production Ep at the wind farms post-contingency is $E(p_{42}, p_{44}, p_{46}, p_{48}, p_{50}) = (1, 2, 0.6, 1, 2.5)$. If this expected production is considered along with associated lower and upper confidence intervals ([0.9, 1.1], [1.7, 2.3], [0.5, 0.7], [0.95, 1.05], [2, 3]), the expectation value of the sum production can be calculated as:

$$E(p_S) = 1 + 2 + 0.6 + 1 + 2.5 = 7.1,$$

$$\sigma_{p_S} = \sqrt{\sum_{i \in S} \sigma_{p_i}^2}$$

$$\approx \sqrt{0.1216^2 + 0.3648^2 + 0.1216^2 + 0.0608^2 + 0.6080^2}$$

$$\approx 0.7321$$

Which furthermore yields 99% confidence intervals $$CI(p_s) \approx 7.1 \pm 0.7321/2\sqrt{2} erf^{-1}(99/100) \approx [6.5\ 7.7]$$

As a final output from this analysis, two contingencies can be generated, where the total generation of the wind units in the group has been modified, for example, down to 6.5 and up to 7.7.

Based on the computed confidence intervals for the group, forecasts which are less conservative but still realistic contingency cases can be realized, through the use of the principle that forecast error for a sum forecast tends to be smaller than the sum of the errors for each of its components.

In another exemplary embodiment, a large number of credible contingencies for the individual wind generators or groups of wind generators can be generated by random sampling of the distributions estimated from the confidence interval information provided by the forecasting system 85 as shown in FIG. 5. Each of these contingencies can be then defined as critical contingencies and then analysed individually. As an example, given the mean value $E(p_{42})$ with associated 90% (y %) confidence intervals [0.9, 1.1] and assuming normal distribution, the standard deviation of the production can be estimated using:

$$\sigma = \frac{\beta - \alpha}{\sqrt{2}\ erf^{-1}(y/100)} = \frac{1.1 - 0.9}{\sqrt{2}\ erf^{-1}(y/100)} \approx 0.1216$$

Subsequently, a number of scenarios with different production of the wind unit can be generated by random sampling from the normal distribution $p_{42,s} \in N(p_{42}, \sigma)$. For example, if 5 scenarios are generated, exemplary values are (0.8525, 0.8396, 1.1132, 1.0014 0.9216). For each scenario a contingency is generated, where the wind farm changes its production to the value drawn from the normal distribution.

This technique of handling the uncertainty of wind power production in contingency analysis is less efficient than the above described embodiment in that the individual analysis of each critical contingency can be computationally prohibitive because of the large number of wind related contingencies that needs to be generated.

In a further exemplary embodiment, the process system can be a predictive system where the contingency evaluation is carried out not only based on the model of the current operating conditions but also incorporates evaluation of contingencies based on forecasted operating conditions. Such forecasted operating conditions can be obtained by the combination of state estimation, consideration of network switching schedules and unit dispatch schedules as well as forecasts of the future loads.

Various modifications may be made to the embodiments hereinbefore described without departing from the scope of the disclosure. The examples embodied detail a meteorological effect which acts upon a group of wind farm units 46, 48 and 50.

However it will be clearly understood that any grouping or combination of wind farm units can be considered.

In the examples given, the forecasting module 83 assumes a normal distribution when computing the confidence interval. However, it will be understood that if distributions other than the normal are used by the forecasting module 83 to generate confidence intervals for the individual units, the equation to calculate the standard deviation of the forecast error would be modified accordingly. For example, the energy generation system has been detailed in FIG. 5 as having a Wind Power Generation Forecast module. However, in the case where a wind power forecasting system is not available, the statistical distribution and its parameters of the wind power generation can be estimated from a time-series of measurements of the wind power generation supplied in transmission 84 from the Supervisory Control and Data Acquisition System 82 or from estimates of the measurements transmitted 88 from the State and Topology Estimator 86.

Furthermore, while the disclosure has been described with reference to wind power, it will be clearly understood that it refers to any similar intermittent energy source including, but not limited to solar power and wave power.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for controlling an electricity generating system that includes a plurality of intermittent energy source generating plants, the method comprising:
    calculating an actual operating parameter of at least a first intermittent energy source generating plant;
    calculating a forecast operating parameter of at least the first intermittent energy source generating plant;
    determining a confidence interval for total production of a group of intermittent energy source generating plants;
    generating an intermittent energy source contingency definition for a sum production of said group of intermittent energy source generating plants from at least one of the actual operating parameter and the forecast operating parameter, with a first contingency definition corresponding to a sum production according to a lower limit of the confidence interval, and a second contingency definition corresponding to the sum production according to an upper limit of the confidence interval;

analyzing the intermittent energy source contingency definitions to provide a contingency analysis; and controlling the electricity generating system in dependence upon the contingency analysis.

2. The method as claimed in claim 1, comprising:

calculating the forecast operating parameter of the first intermittent energy source generating plant by a combination of state estimation, consideration of network switching schedules and unit dispatch schedules as well as forecasts of future loads.

3. The method as claimed in claim 1, wherein calculating an actual operating parameter of the first intermittent energy source generating plant comprises:

measuring a predetermined number of parameters of the first intermittent energy source generating plant; and calculating the actual operating parameter using the measured parameters and a predetermined model of the first intermittent energy source generating plant.

4. The method as claimed in claim 1, wherein the first intermittent energy source is wind power.

5. The method as claimed in claim 1, comprising:

calculating plural actual operating parameters of the first intermittent energy source generating plant, wherein wind speed and wind direction are determined as plural actual operating parameters.

\* \* \* \* \*